US012761528B2

(12) United States Patent
Boehm et al.

(10) Patent No.: US 12,761,528 B2
(45) Date of Patent: Oct. 13, 2026

(54) CONE-TEXTURED GLARE SHIELD FOR ENHANCED CAMERA VISION

(71) Applicant: Tesla, Inc., Austin, TX (US)

(72) Inventors: Markus Boehm, Fremont, CA (US); Christos Gougoussis, Fremont, CA (US); Gabriel Isaac Geyne, Pleasanton, CA (US); Saurabh Dhavane, Fremont, CA (US)

(73) Assignee: Tesla, Inc., Austin, TX (US)

( * ) Notice: Subject to any disclaimer, the term of this patent is extended or adjusted under 35 U.S.C. 154(b) by 190 days.

(21) Appl. No.: 18/646,053

(22) Filed: Apr. 25, 2024

(65) Prior Publication Data

US 2025/0334856 A1 Oct. 30, 2025

(51) Int. Cl.
*G03B 11/04* (2021.01)
*B60J 3/04* (2006.01)
*G02B 1/11* (2015.01)

(52) U.S. Cl.
CPC ............... *G03B 11/045* (2013.01); *B60J 3/04* (2013.01); *G02B 1/11* (2013.01)

(58) Field of Classification Search
CPC . G03B 11/045; B60J 3/04; G02B 1/11; B60R 11/04
See application file for complete search history.

(56) References Cited

U.S. PATENT DOCUMENTS

| | | | | |
|---|---|---|---|---|
| 5,384,571 | A | 1/1995 | Myers et al. | |
| 2003/0224144 | A1 | 12/2003 | King et al. | |
| 2005/0074579 | A1* | 4/2005 | Suzuki | G02B 1/118 428/141 |

(Continued)

FOREIGN PATENT DOCUMENTS

| | | |
|---|---|---|
| CN | 210958477 | 7/2020 |
| CN | 120848092 | 10/2025 |

(Continued)

OTHER PUBLICATIONS

"European Application Serial No. 25171731.0, Partial European Search Report mailed Sep. 18, 2025", 16 pgs.
"European Application Serial No. 25171731.0, Extended European Search Report mailed Nov. 14, 2025", 14 pgs.
Bowen, R, "Proper utilization of porous mold steel to solve venting problems", Annual Technical Conference of the Society of Plastics Engineers, vol. 1, May 1, 1999, 1-3.

(Continued)

*Primary Examiner* — Nathanael R Briggs
(74) *Attorney, Agent, or Firm* — Schwegman Lundberg & Woessner, P.A.

(57) ABSTRACT

The present disclosure pertains to a glare shield designed to enhance the performance of vehicle camera systems, particularly those used in autonomous and semi-autonomous vehicles. The glare shield features a textured surface composed of an array of micro-cones, or cone-shaped formations, which serve to scatter incident light in various directions, thereby reducing glare and improving camera vision. The micro-cones are optimized in size, angle, and orientation to minimize Total Hemispherical Reflectance (THR) and reflection penalty, enhancing the camera's ability to accurately interpret visual data. Additionally, the glare shield may include an electromechanical system for dynamic orientation adjustment in response to the position of external light sources, such as the sun. The manufacturing process of the glare shield utilizes a sintered tool steel insert, facilitating venting during molding and ensuring the precision of the cone-shaped texture.

26 Claims, 15 Drawing Sheets

(56) References Cited

U.S. PATENT DOCUMENTS

| | | | | |
|---|---|---|---|---|
| 2014/0098325 | A1* | 4/2014 | Murata | G02B 1/111 428/1.31 |
| 2019/0064636 | A1* | 2/2019 | Kang | G03B 11/045 |
| 2022/0289120 | A1 | 9/2022 | Miller et al. | |
| 2023/0083180 | A1* | 3/2023 | Miyashita | G02B 1/11 359/601 |

FOREIGN PATENT DOCUMENTS

| | | | | |
|---|---|---|---|---|
| DE | 102014217749 | | 3/2016 | |
| DE | 102019134006 | | 6/2021 | |
| DE | 102019134006 | A1 * | 6/2021 | G03B 17/02 |
| EP | 3258313 | | 12/2017 | |
| JP | 2025168302 | | 11/2025 | |

OTHER PUBLICATIONS

Taylor, L A, "The Use Of Porous Steel To Eliminate Gas Entrapment And Material Burning During The Molding Process", Society of Plastics Engineers. Annual Technical Conference Antec. Proceedings, Society of Plastics Engineers, US, vol. 1, May 1, 1997, 989-993.

"European Application Serial No. 25171731.0, Response filed Feb. 22, 2026 to Extended European Search Report mailed Nov. 14, 2025", W English Claims, 18 pgs.

* cited by examiner

Forbidden Normals 904 906 902

| Definition | Specification for glareshield | Specification for b-pillar | Equipment |
|---|---|---|---|
| Color,L (AOI = 8 deg) | <7.5 | <12 | |
| Color,a (AOI = 8 deg) | 0+/-1 | 0+/-1 | |
| Color,b (AOI = 8 deg) | 0+/-1 | 0+/-1 | |
| Total hemispherical reflectance (400-700nm, AOI = 8 deg) | <1.2% | <1.9% | Xrite integrating sphere CI7600 |
| Gloss (AOI = 20 deg) | <1 GU | <1.6 GU | BYK imac glossmeter Per ASTM D523 |
| Gloss (AOI = 60 deg) | <1 GU | <1.6 GU | BYK imac glossmeter Per ASTM D523 |
| Gloss (AOI = 85 deg) | <1.5 GU | <2.4 GU | BYK imac glossmeter Per ASTM D523 |

FIG. 9A

CONE-TEXTURED GLARE SHIELD FOR ENHANCED CAMERA VISION

TECHNICAL FIELD

The present application relates generally to automotive safety systems, and more specifically to a textured glare shield to improve the functionality of vehicle autopilot camera systems by reducing glare and light reflections in some examples.

BACKGROUND

Autonomous and semi-autonomous vehicles rely heavily on camera systems to navigate and interact with their environment. These camera systems, often part of an Auto-Pilot (AP) feature, require a clear and unobstructed view of the vehicle's surroundings to function correctly. The performance of these systems is critical for the safety and reliability of autonomous driving features.

In the operation of such camera systems, one of the persistent challenges is the interference caused by glare. Glare can significantly degrade the quality of the images captured by the cameras, leading to potential misinterpretations of visual data. This is particularly problematic when the cameras are exposed to direct or reflected sunlight, or to the headlights of oncoming vehicles, especially during low-light conditions such as dawn, dusk, or nighttime.

Traditional glare shields in vehicles are designed to shield camera lenses from excess light. These glare shields are typically flat or slightly contoured surfaces that may be treated with various coatings to reduce reflectivity. However, these conventional treatments have limitations in their ability to scatter light effectively, which can still result in significant glare and reflection into the camera lenses.

The effectiveness of a glare shield is often characterized by its Total Hemispherical Reflectance (THR), which is a measure of the light reflected from a surface when illuminated from all directions. Lower THR values indicate better performance in reducing glare. Existing glare shield designs and coatings have not achieved the low THR values desirable for optimal camera performance.

Furthermore, the manufacturing processes for creating these glare shields can be complex and may involve multiple steps, including the application of specialized paints and coatings, which can add to production time and costs.

BRIEF SUMMARY

Some examples of the present disclosure provide a glare shield that reduces glare and light reflections into the lenses of Auto-Pilot (AP) cameras used in autonomous and semi-autonomous vehicles. The glare shield includes a cone-shaped texture that enhances light diffusion and, in some examples, minimizes the Total Hemispherical Reflectance (THR), thereby improving the clarity and reliability of the camera's vision.

In some examples, the cone-shaped texture includes an array of micro-cones, also referred to as cone-shaped formations or cones herein, molded into the surface of the glare shield. These micro-cones scatter incoming light in multiple directions, reducing the likelihood of direct reflections into the camera lens. In some examples, the surface of the glare shield is further treated with a coating such as an ultra-black coating that has low reflectivity and high light absorption properties. This dual approach of textured geometry and specialized coating can, in some examples, synergistically reduce glare and enhance camera performance.

Additionally, some examples include an electromechanical system that enables the glare shield to adjust its orientation dynamically. In some examples, a stepper motor is integrated to move the glare shield along multiple axes, allowing for real-time adjustments based on the position of the sun or other light sources. In some examples, this dynamic feature seeks to ensure that the glare shield maintains an optimal orientation to provide the best possible light diffusion throughout various times of the day and under different driving conditions.

In some examples, the glare shield is manufactured using a sintered tool steel insert that allows for venting during the molding process. This may simplify the manufacturing process and ensures the precision and consistency of the cone-shaped texture.

Thus, in summary, some examples provide a glare shield with improved light scattering capabilities, a dynamic orientation system, and a streamlined manufacturing process. In some examples, these features can provide significant improvements over existing glare shield technologies, enhancing the performance of AP camera systems and, consequently, the safety and functionality of autonomous and semi-autonomous vehicles.

BRIEF DESCRIPTION OF THE DRAWINGS

Throughout the drawings, reference numbers may be re-used to indicate correspondence between referenced elements. The drawings are provided to illustrate examples of the subject matter described herein and not to limit the scope thereof.

FIG. 9A is a table of example specifications for different embodiments of the glare shield, according to some examples.

DETAILED DESCRIPTION

The present disclosure relates to a glare shield to enhance camera vision and, in some examples, the performance of autopilot camera systems in vehicles by reducing glare from sunlight and other external light sources. In some examples, the glare shield includes a tray-like or dish-like structure positioned in front of the camera lens, within the camera's field of view, and is configured to prevent reflected light from entering the lens and causing glare.

In some examples, a non-reflective or low-reflectivity textured surface of the glare shield is characterized by a multitude of micro-cones, each cone designed to scatter incoming light. The cones are arranged in a uniform pattern and are optimized in terms of their cone half-axis angle and cone orientation angle to minimize a reflection penalty, which can be a measure of the undesirable reflection from the glare shield surface. Some optimal cone orientation angles have been determined to range between 55 to 90 degrees, with the most effective cone half-axis angle angles being between five to 10 degrees.

In manufacturing an example glare shield, a sintered steel mold is employed, which is created using a laser etching process to form a detailed cone pattern. The sintered nature of the steel allows for air to escape during the injection molding process, ensuring that the cones are formed without air traps and maintain their pointed shape. This pointed shape can be helpful for reducing the surface area available for light reflection, thereby enhancing the light-scattering effect.

In some examples, the glare shield's textured design eliminates the need for additional coatings or paints, which are traditionally used to reduce glare. By removing this step, the manufacturing process becomes more efficient and cost-effective. Furthermore, the glare shield's material and texture inherently possess low reflectivity, which may negate the necessity for post-molding treatments.

In some examples, however, the textured surface is coated with a non-reflective or low-reflectivity coating, such as an ultra-black coating, that has low reflectivity and high light-absorption properties. This dual approach of textured geometry and specialized coating can, in some examples, synergistically reduce glare and enhance camera performance.

An additional aspect of the inventive subject matter is the incorporation of an electromechanical adjustment system that allows the glare shield to dynamically change its orientation in response to the position of the sun or other light sources. This system includes small actuators that provide the glare shield with the capability to tilt and maintain the optimal angle for light diffusion, ensuring consistent camera performance throughout varying lighting conditions.

Figure 1:
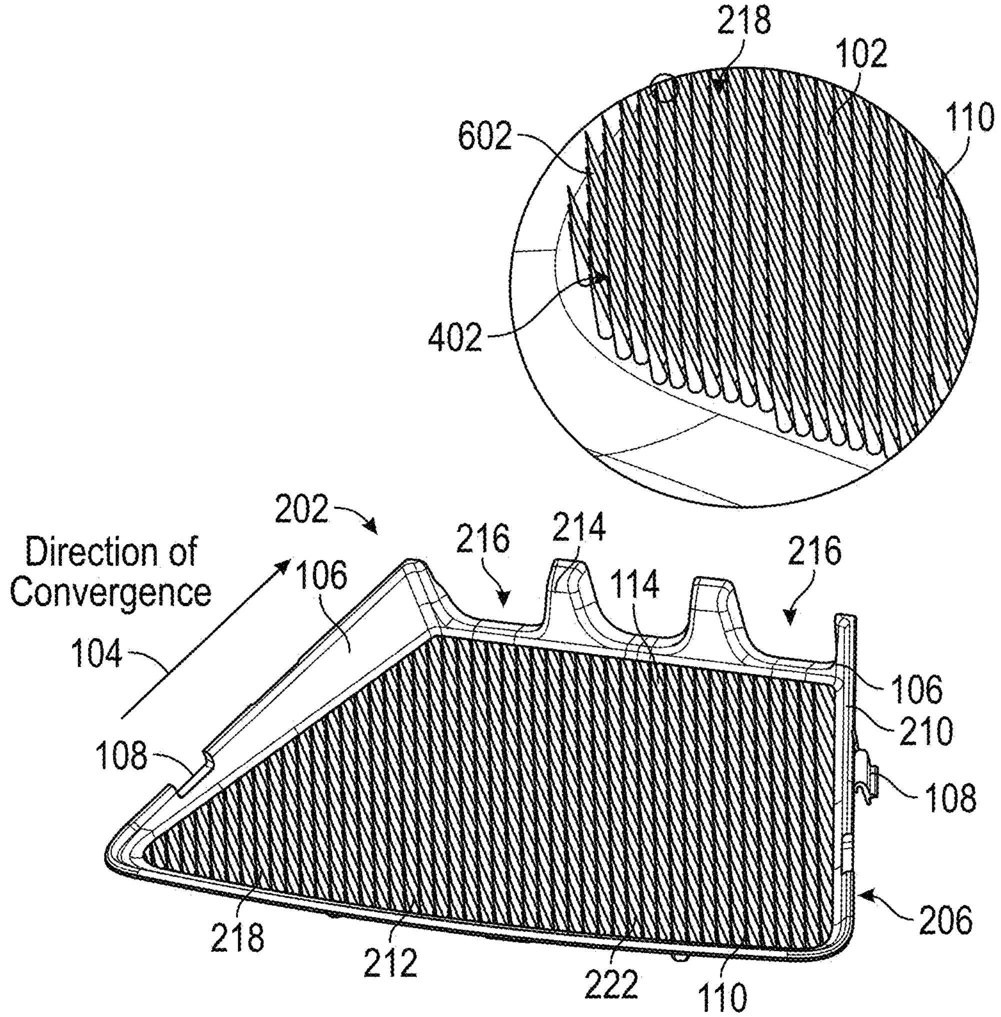
FIG. 1 is a perspective view of a glare shield, showing an enlarged view of a cone-textured surface to scatter incident light, according to some examples.
Figure 2:
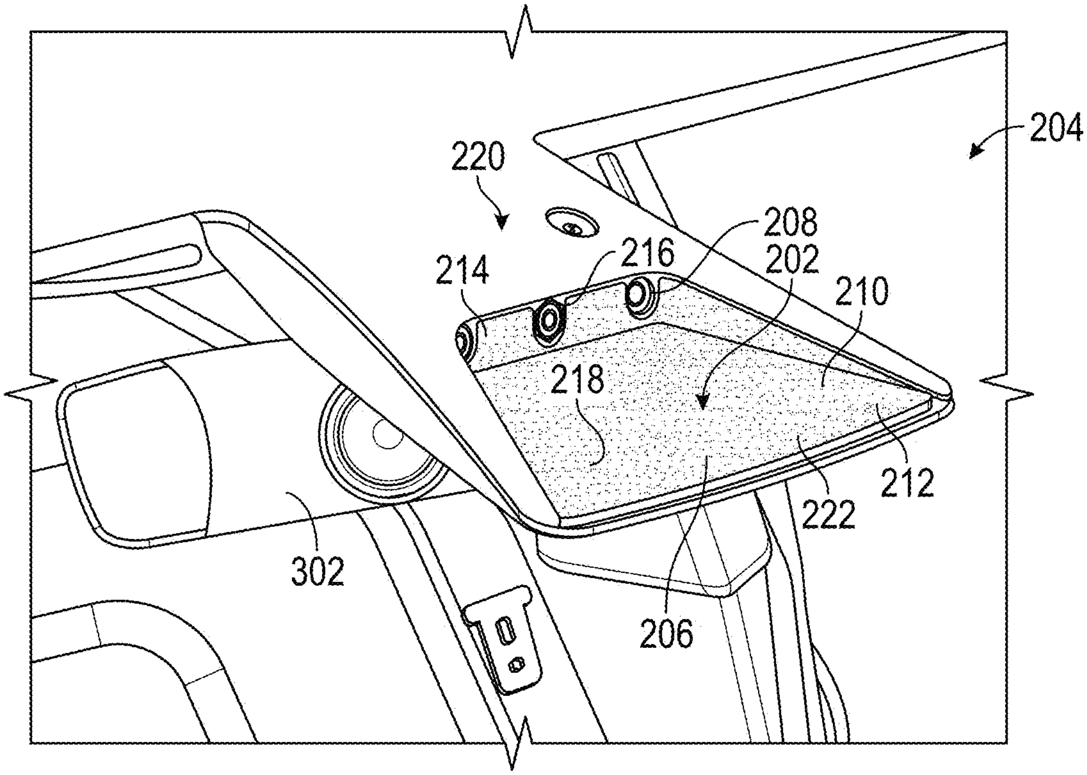
FIG. 2 is a perspective view of a glare shield installed behind a vehicle's windscreen, according to some examples.

With reference to FIG. 1 and FIG. 2, a glare shield 202 according to some examples is now described. FIG. 1 shows a pictorial view of an example glare shield 202. FIG. 2 shows the glare shield 202 installed behind a windscreen 204 in a vehicle adjacent a rearview mirror 302. The glare shield 202 may be located adjacent to or in association with a vehicle camera system 220. The vehicle camera system 220 may include one or more cameras 208 and other componentry. The vehicle camera system 220 may be used in conjunction with an autonomous or semi-autonomous vehicle guidance system. Other components of the vehicle camera system 220 may include a control system and an environmental sensor described further below. In some examples, the glareshield 202 includes one or more alignment or mounting formations 108. Further and other components are possible.

Figure 3A:
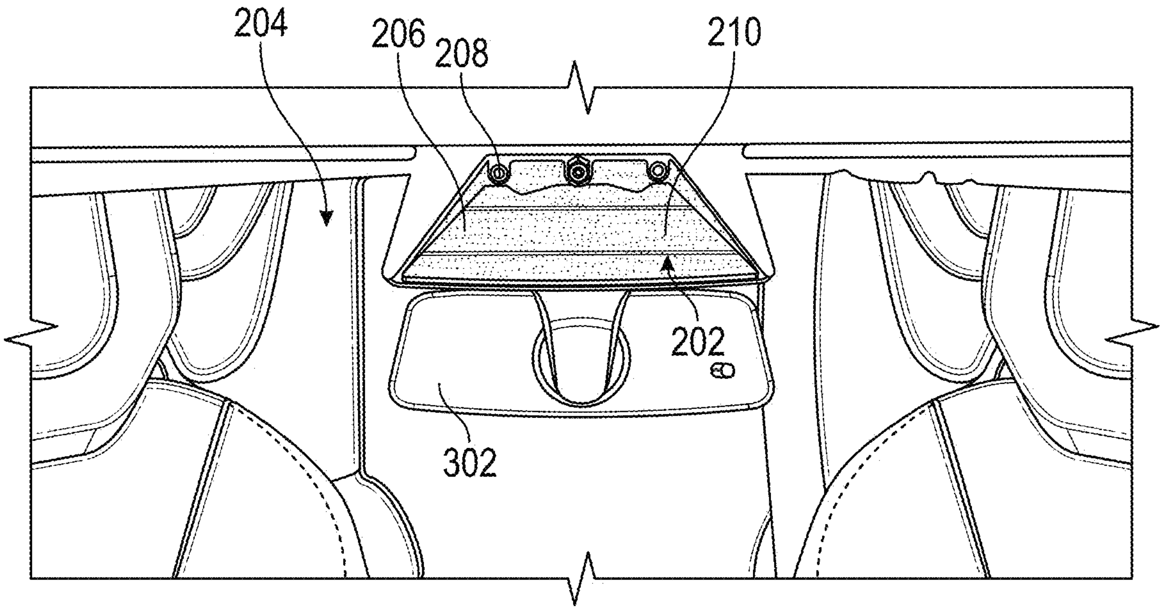
FIG. 3A is a perspective view of a glare shield adjacent a rearview mirror 302, illustrating a convergent tray structure with a textured surface, according to some examples.

The glare shield 202 generally includes a body 206 of molded material. In the illustrated examples of FIG. 1, FIG. 2, and FIG. 3A, the body 206 includes a convergent tray structure 210 (or convergent light-directing configuration) that has a direction of convergence 104, when installed in a vehicle, directed towards at least one of the cameras 208 of the vehicle camera system 220. In some examples, a distal region 212 (relative to a camera 208) of the convergent tray structure 210 is shallower than a proximal region 114 of the convergent tray structure 210.

Figure 3B:
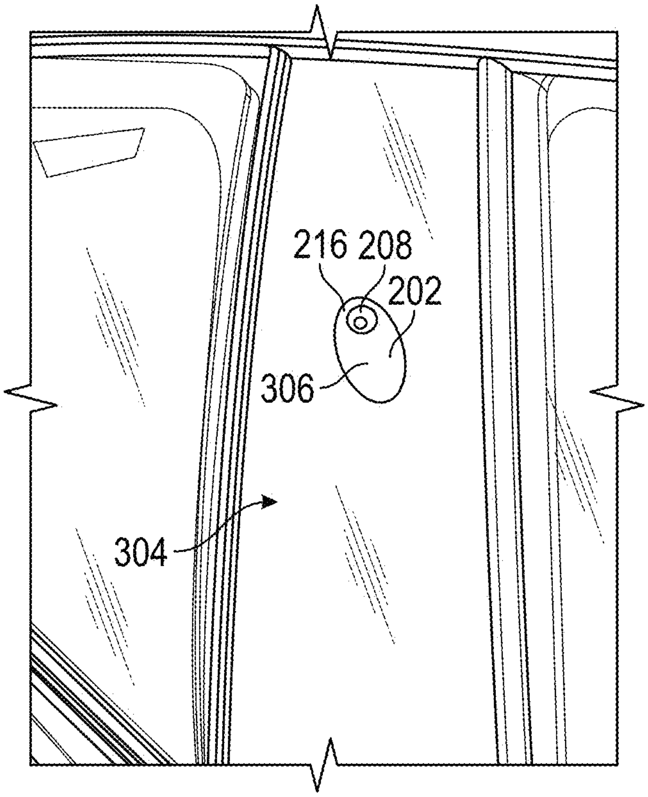
FIG. 3B is a perspective view of an alternative embodiment of a glare shield with an elliptical or dished profile, mounted in a vehicle structure such as a B pillar, according to some examples.

Other arrangements and configurations of the body 206 of the glare shield 202 are possible, for example as shown in FIG. 3B, where the example glare shield 202 is shown mounted in a vehicle structure 304, such as a B pillar, and includes an elliptical or dished profile 306. Whether convergent or dished, the glare shield 202 is generally configured to reduce glare and light reflections into the lens of the camera 208, or an array of cameras 208.

As shown in FIG. 1 and FIG. 3B, the glare shield 202 may include one or more slots or openings 216 to accommodate or provide an open field of view for the one or more cameras 208 of the vehicle camera system 220. In the example of FIG. 1, the one or more slots or openings 216 are provided or defined in a rear wall 214 of the convergent tray structure 210. In the example of FIG. 3B, a slot or opening 216 for the camera 208 is provided within the elliptical or dished profile 306.

Returning to FIG. 1, the convergent tray structure 210 of the body 206 includes one or more internal surfaces defined by one or more structural elements of the body 206, such as the rear wall 214, side panels 106, and a lower floor 222. An exploded view of a portion of the lower floor 222 is shown in FIG. 1. In the illustrated example, the lower floor 222 will be seen to include a textured surface 218. Other internal surfaces are free of a textured surface 218. In FIG. 2, all of the internal surfaces of the glare shield 202 include a textured surface 218. Other arrangements and combinations are possible.

As shown in the exploded view of FIG. 1, the textured surface 218 includes a plurality of cone-shaped formations 402 also referred as micro-cones herein. Example cone-shaped formations 602 forming a field of a plurality of cone-shaped formations 402 in a zone of the glare shield 202 are described in more detail below. Generally speaking, the cone-shaped formations 602 are configured to scatter incident light in multiple directions to reduce glare on a camera 208 of the vehicle camera system 220. In some examples, the cone-shaped formation 602 are arranged in a uniform pattern or arrangement 102 across the textured surface 218, as shown.

In some examples, the textured surface 218 is coated with a low-reflectivity coating 110, such as an ultra-black coating that has low reflectivity and high light-absorption properties. This dual approach of textured geometry and specialized coating can, in some examples, synergistically reduce glare and enhance camera performance.

Figure 4A:
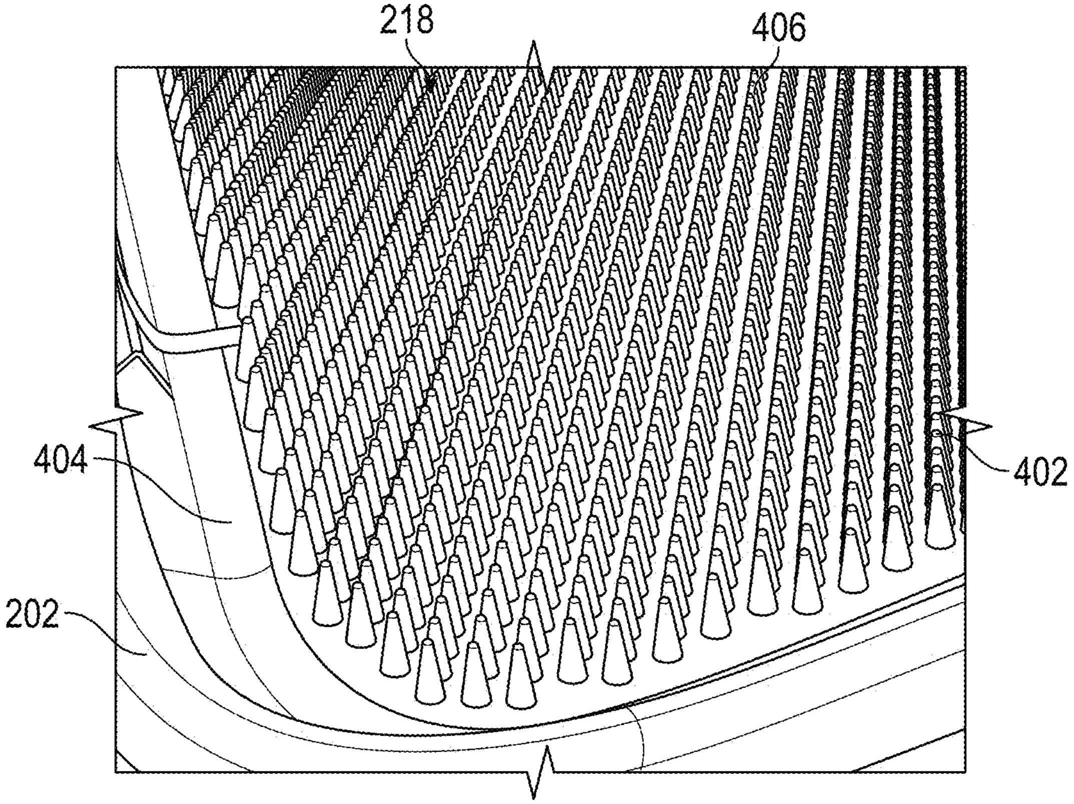
FIG. 4A-FIG. 4B show close-up views of a portion of the glare shield, showing example cone-shaped formations in a textured surface, according to some examples.
Figure 4B:
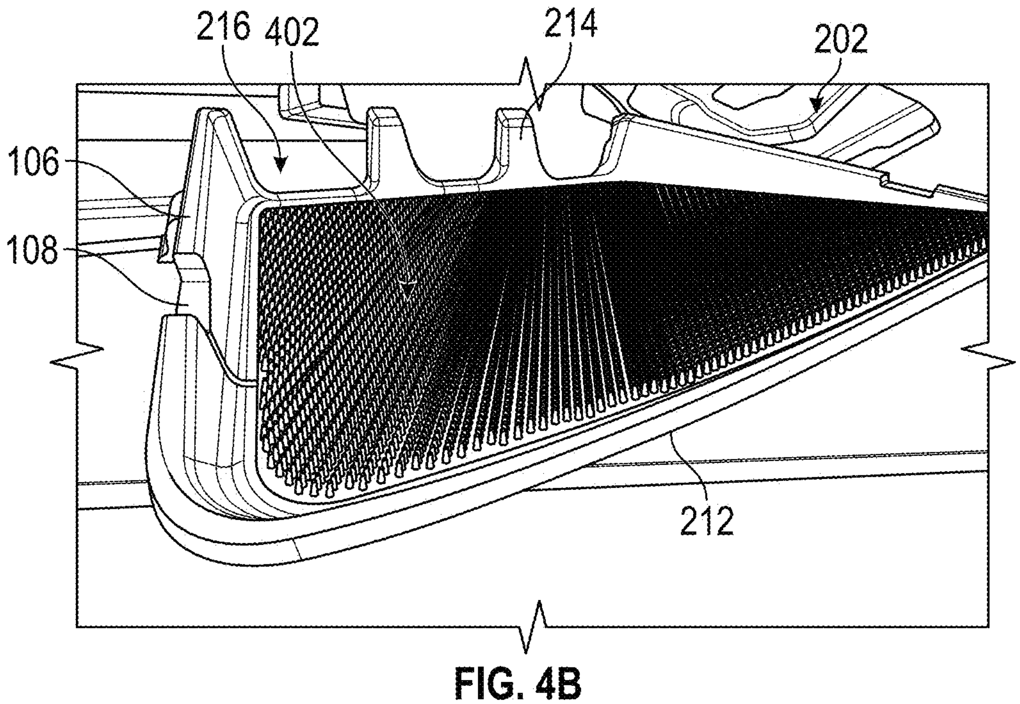

FIG. 4A and FIG. 4B show portions of an example glare shield 202 that include a textured surface 218 comprising a plurality of cone-shaped formations 402. The plurality of cone-shaped formations 402 may be provided in a targeted field 406 or zone of the glare shield 202, for example as shown. The targeted field 406 may be surrounded at least in part by a cone-free zone 404.

Figure 5A:
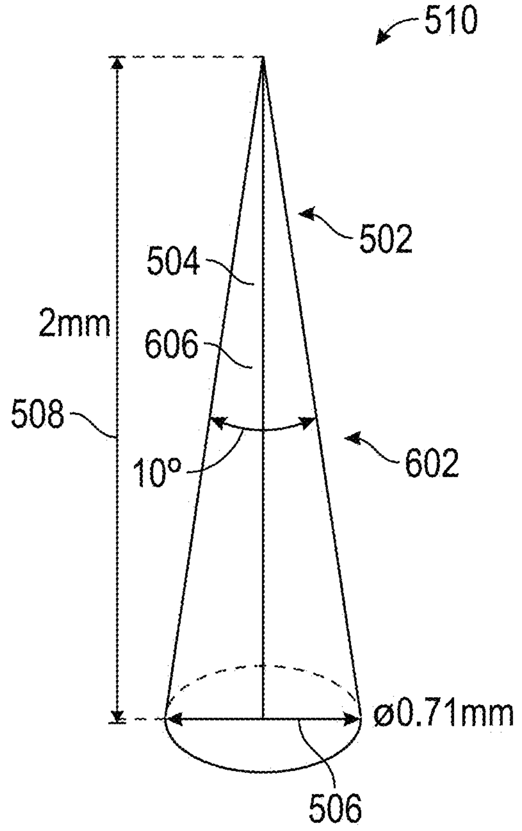
FIG. 5A is a cross-sectional view of a cone-shaped formation, showing example dimensions and angles that may contribute to minimizing light reflection, according to some examples.
Figure 5B:
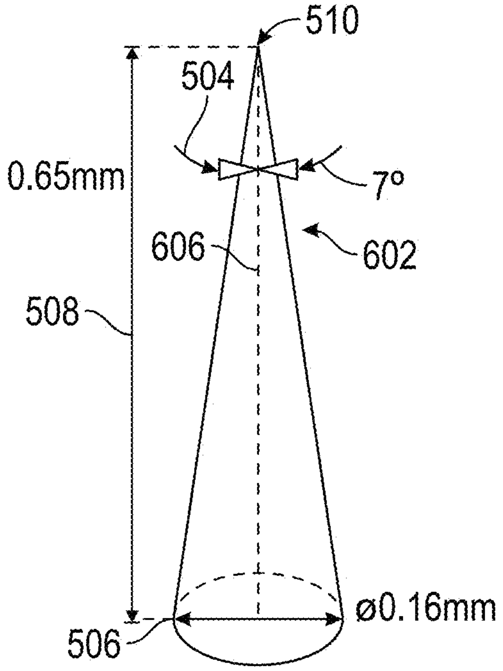
FIG. 5B is a cross-sectional view of a cone-shaped formation, showing example dimensions and angles that may contribute to minimizing light reflection, according to some examples.
Figure 6:
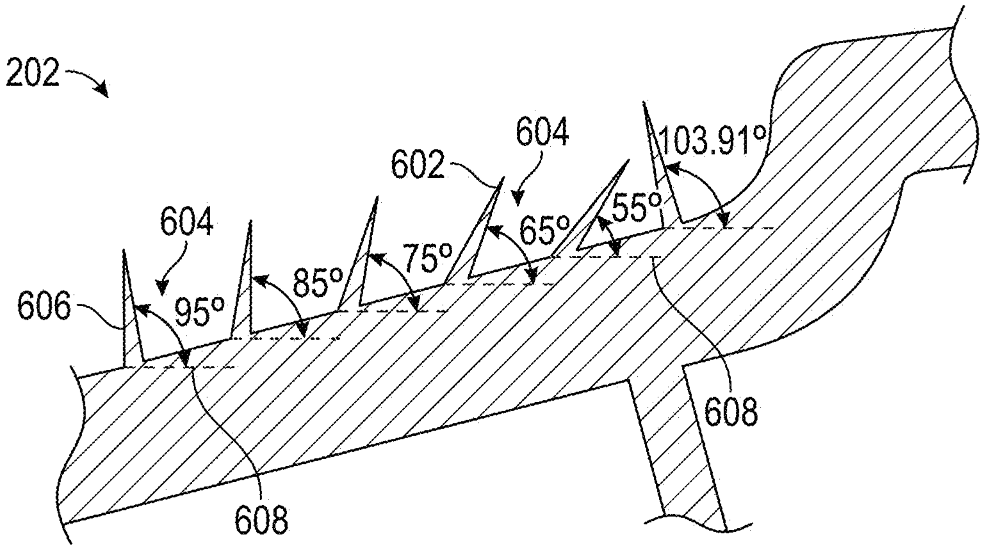
FIG. 6 is a schematic illustrating example orientations of cone-shaped formations relative to a horizontal plane when the glare shield is installed in a vehicle, according to some examples.

With reference to FIG. 5A, FIG. 5B, and FIG. 6, in some examples the cones in a field or plurality of cone-shaped formations 402 are configured in terms of their size, cone angle, and orientation to minimize reflection. In some examples, a reflection penalty can be used as a measure of the undesirable reflection from a glare shield surface.

In some examples, at least some of cone-shaped formations are configured to reduce or optimize a Total Hemispherical Reflectance (THR) value for the vehicle camera system. To this end, some configured dimensions 502 and features of a cone-shaped formation 602 can include a cone top 510, a cone base diameter 506, a cone height 508, a longitudinal cone half-axis 606, a cone half-axis angle 504, and (with reference to FIG. 6) a cone orientation angle 604 relative to a horizontal plane 608 when the glare shield 202 is installed behind a windscreen 204 or structure 304 (e.g., A, B, C, or D pillar), for example.

As shown in FIG. 5A and FIG. 5B, an example cone height 508 may be in a range of 0.65 to 2 millimeters (mm). An example cone half-axis angle 504 may be in a range of 7 to 10 degrees. In some examples, a cone base diameter 506 of the cone-shaped formations 602 is in a range of 0.16 to 0.71 mm. In some examples, a cone base diameter 506 of the cone-shaped formations 602 is between 0.5 mm and 2 mm. In some examples, the base diameters of cone-shaped formations 602 in a field or plurality of cone-shaped formations 402 touch each other (i.e., are contiguous) to minimize the presence of flat, reflective, potentially glare-producing surfaces in the textured surface 218 of a glare shield 202. Other cone-spacing arrangements are possible. A cone top 510 may be sharp, for example as shown in FIG. 5A and FIG. 5B, or rounded, for example as shown in FIG. 4A and FIG. 4B. In some examples, the cone-shaped formations have a cone half-axis angle in a range of 5-20 degrees. In some examples, the cone half-axis angle is in a range of 7-10 degrees.

In further aspects, the glareshield's surface is not merely textured but is characterized by a uniform pattern of cone-shaped formations. This uniformity can be helpful to ensuring consistent light-scattering properties across the entire surface of the glareshield. In some examples, a precise arrangement of the cones is such that the base diameters of adjacent cones are contiguous, minimizing the presence of flat, reflective surfaces that could contribute to glare.

Figure 7A:
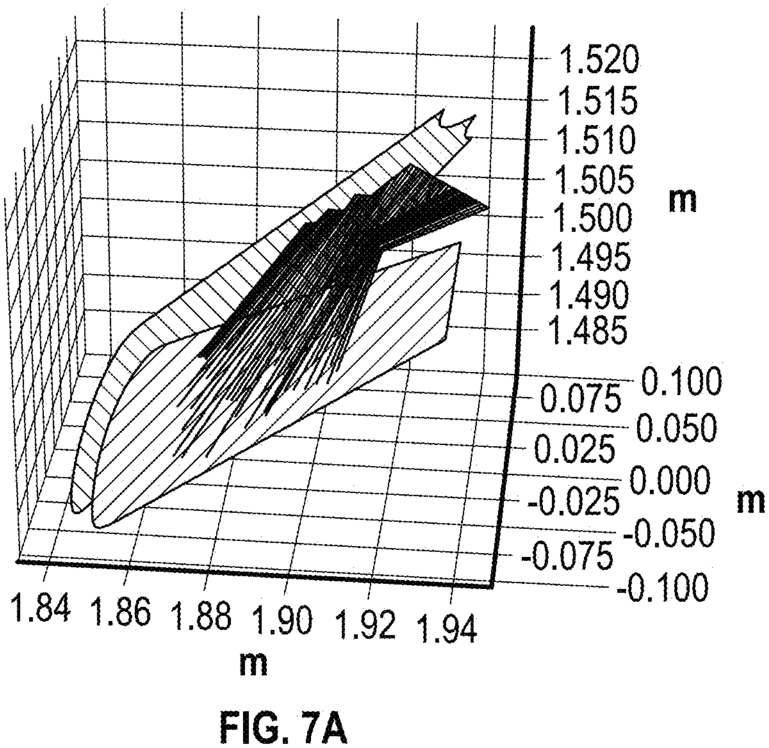
FIG. 7A-FIG. 7C are graphs showing example results of a simulation analysis on reflection penalty for a standardized cone half-axis angle, according to some examples.
Figure 7B:
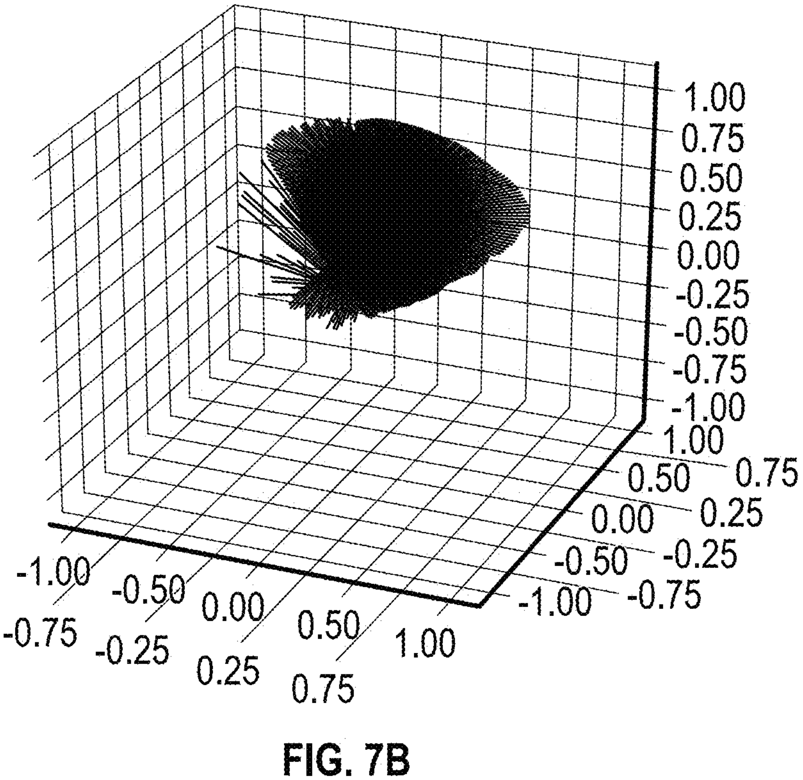
Figure 7C:
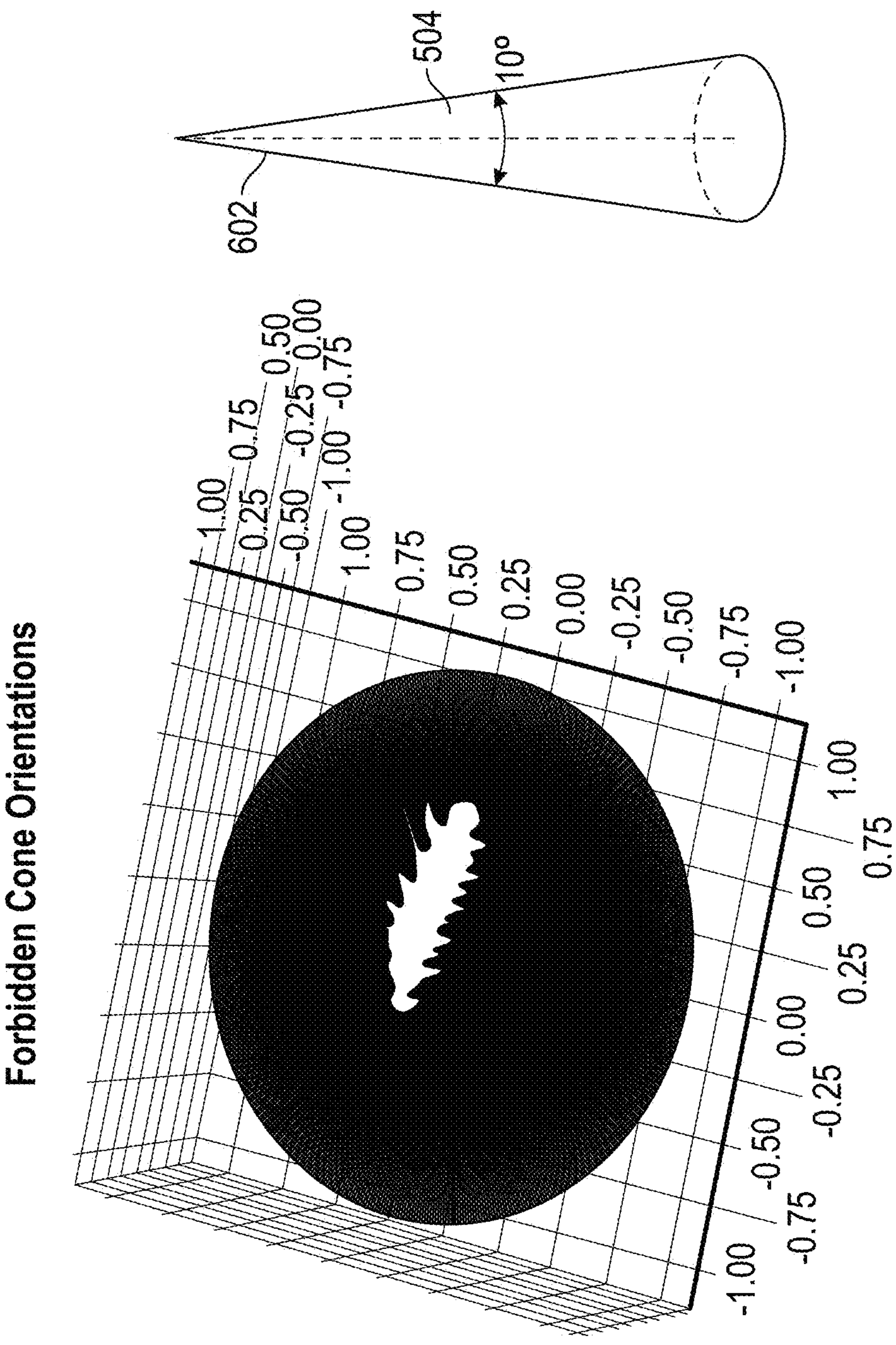

With reference to FIG. 7A-FIG. 7E, a simulation analysis was performed to assess reflection penalty for a cone-shaped formation 602 having a standardized cone half-axis angle 504 of 10 degrees, as shown adjacent the view of FIG. 7C. FIG. 7A shows in graphical form captured assessment data relating to a ray tracing, FIG. 7B shows in graphical form captured assessment data relating to surface normals indicating some forbidden normal values, and FIG. 7C shows in graphical form captured assessment data relating to cone orientation angle indicating some forbidden cone orientation angles.

Figure 7D:
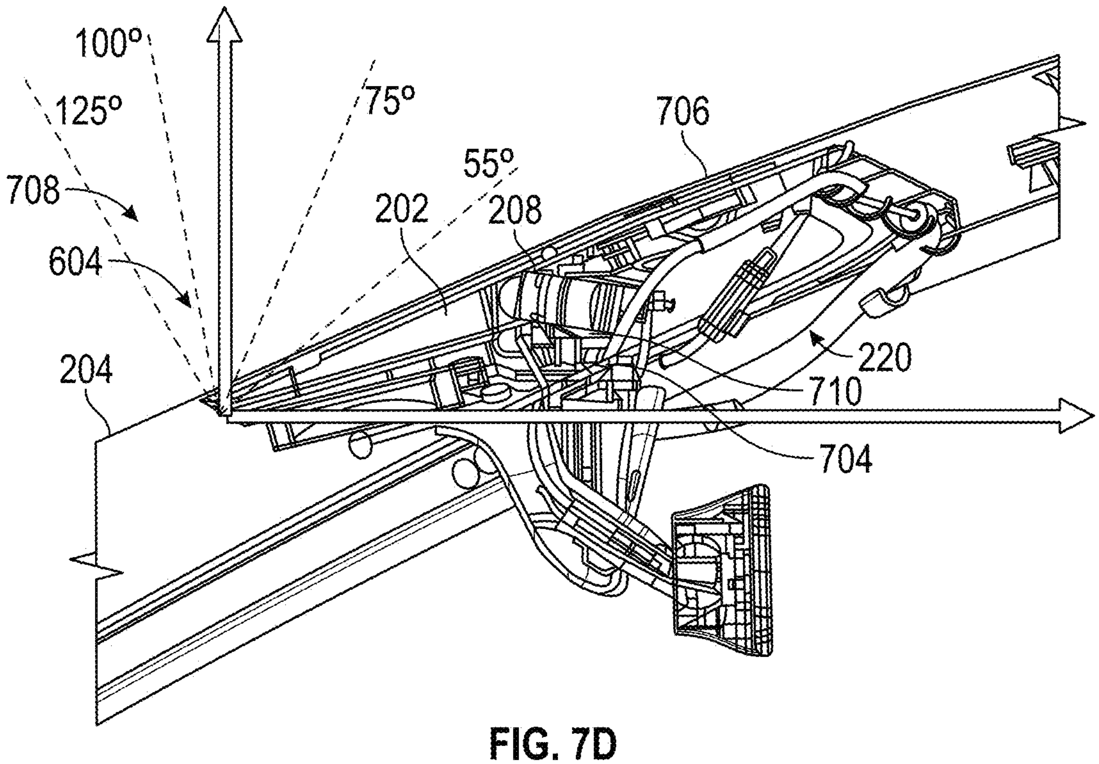
FIG. 7D is a cross-sectional view of an example glare shield in relation to the vehicle camera system components, according to some examples.
Figure 7E:
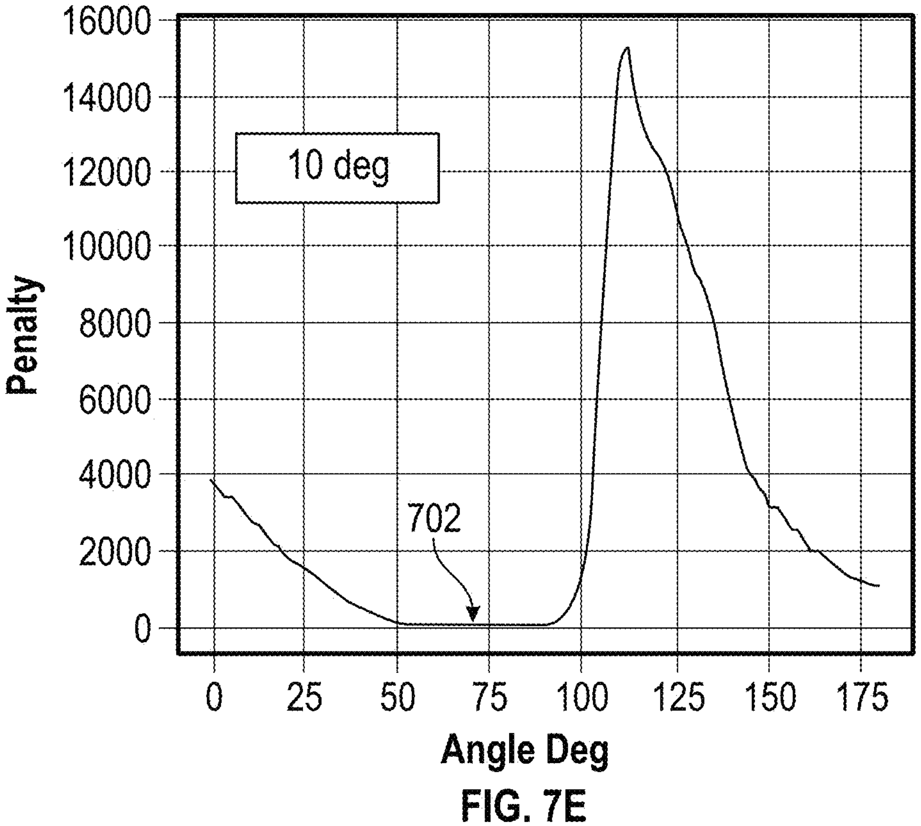
FIG. 7E is a graph showing example reflection penalty values for a standardized cone half-axis angle across a range of assessed cone orientation angles, showing a minimum penalty zone, according to some examples.
Figure 8A:
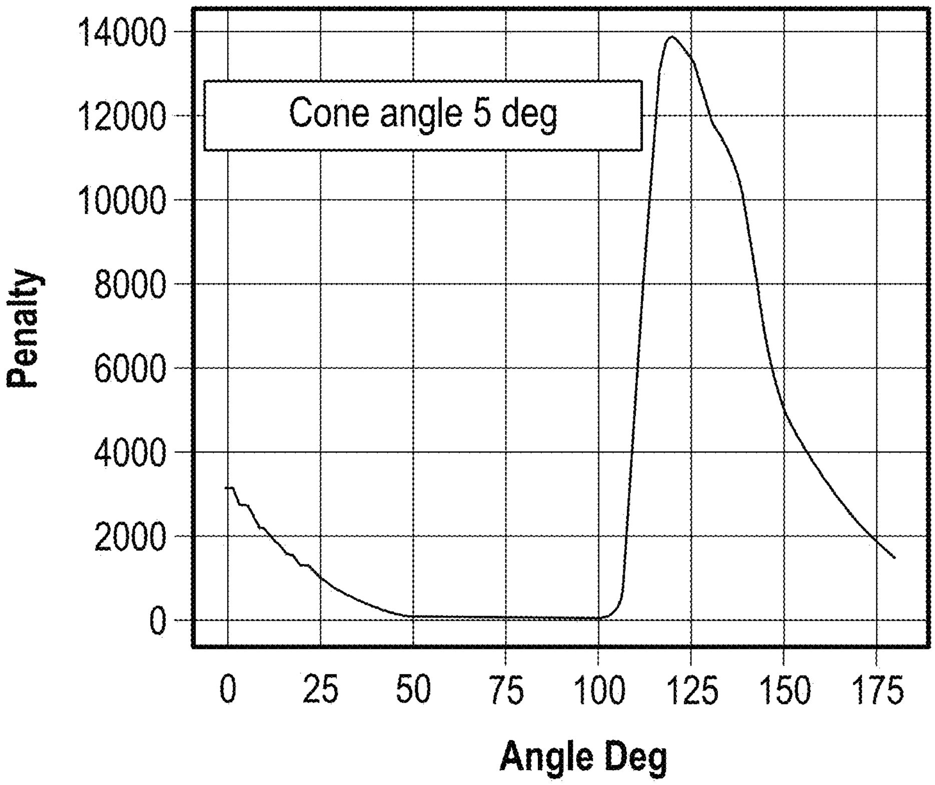
FIG. 8A through FIG. 8E are various graphical representations of example reflection penalty and cone orientation values across a range of assessed cone half-angle axis angles used to determine example optimal cone-shaped formation configurations for different glare shield embodiments, according to some examples.
Figure 8B:
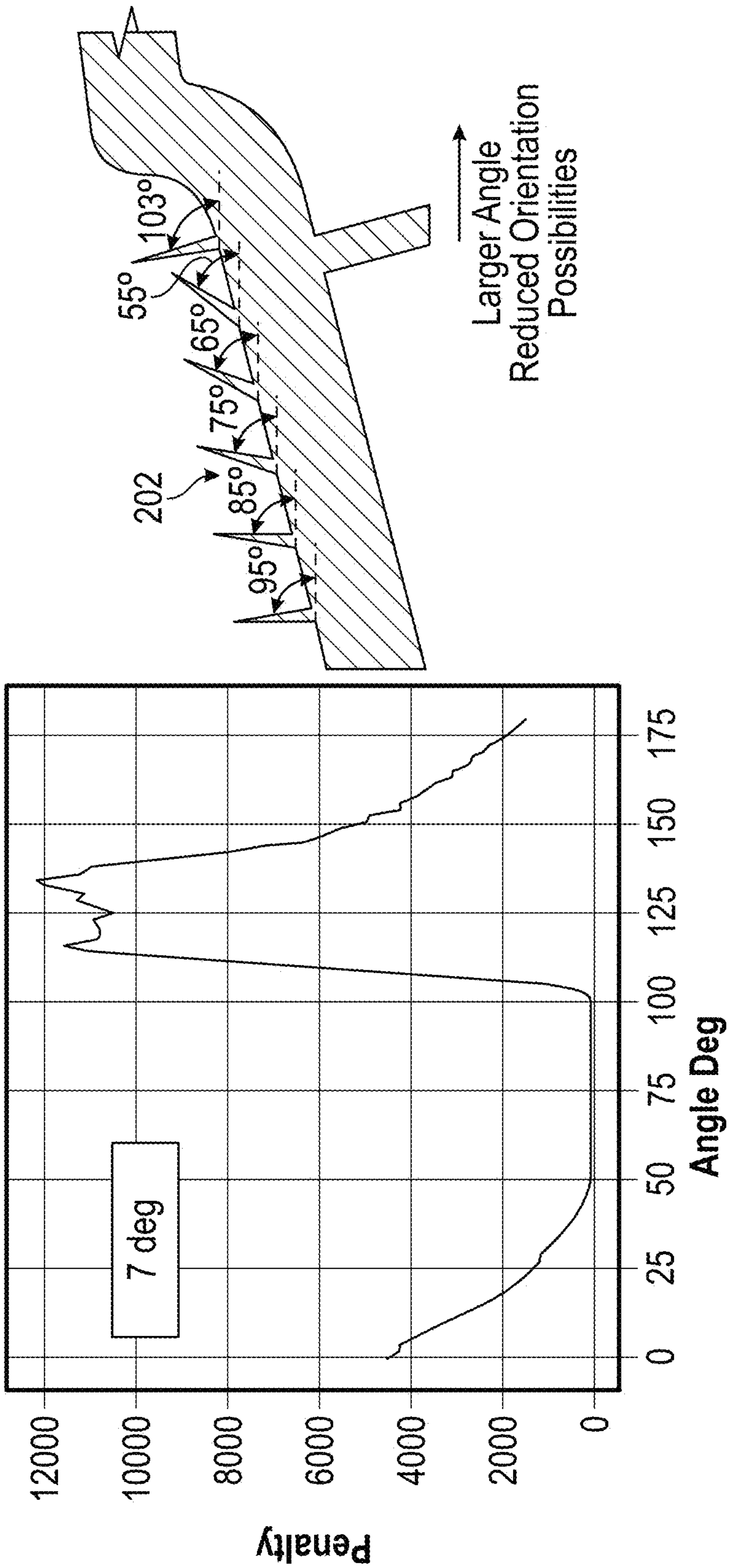
Figure 8C:
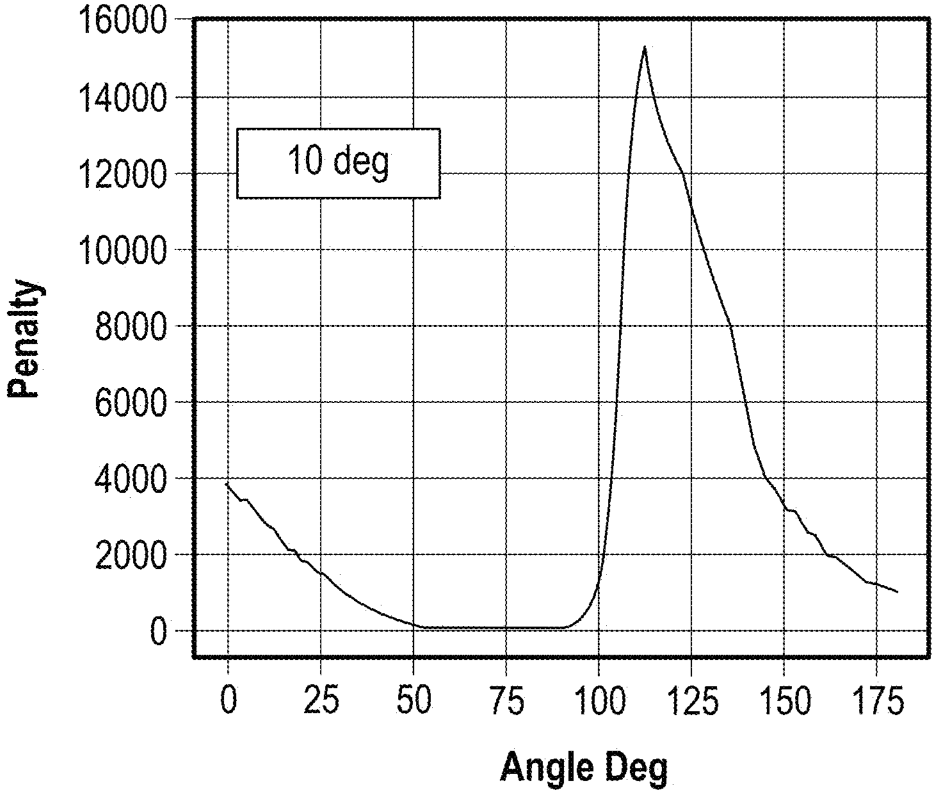
Figure 8D:
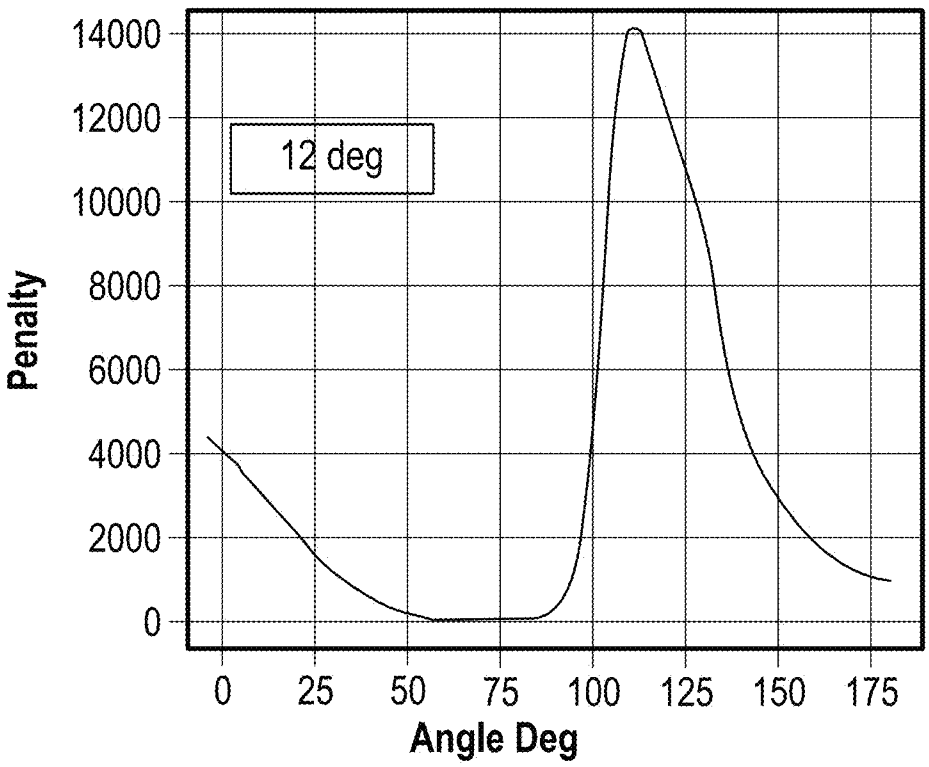
Figure 8E:
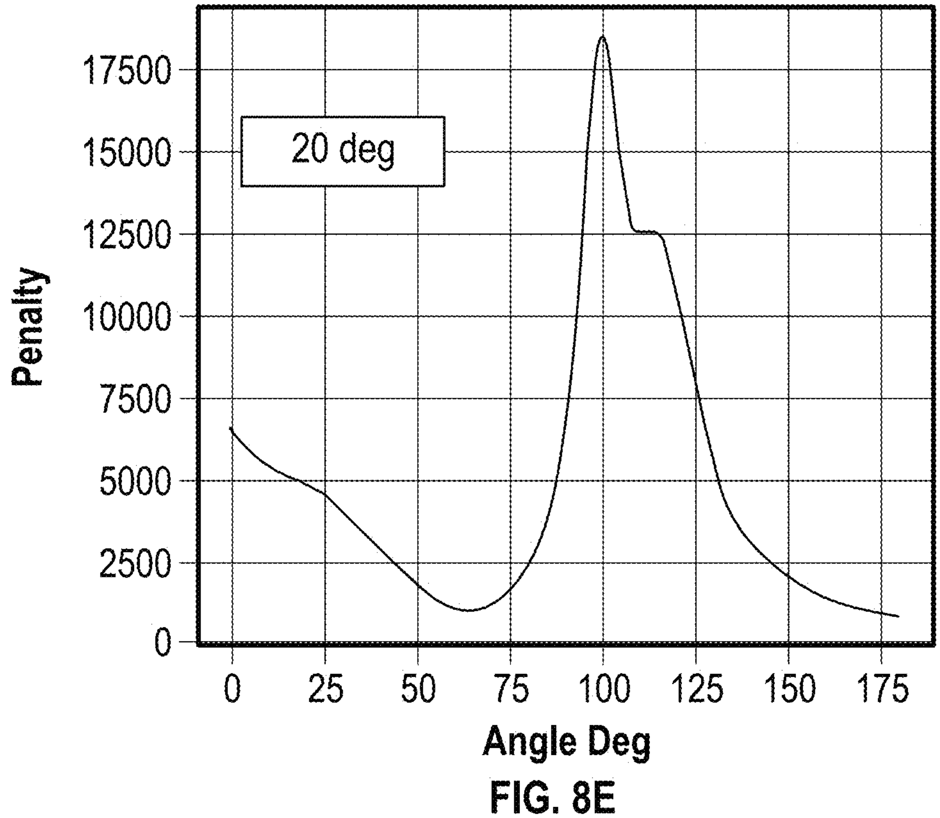

In FIG. 7D, a range of assessed cone orientation angles 604 is visible, and results of these cone orientation angles 604 can be seen in the reflection penalty graph of FIG. 7E. The reduced reflection penalty values in the minimum penalty zone 702 of FIG. 7E indicate that an optimum cone orientation angle 604 is in a range of 55 to 90 degrees, in some examples, with the most effective cone half-axis angle angles being between five to 10 degrees. Other ranges of cone orientation angle 604 may be possible for cone-shaped formations 602 having different cone half-axis angles, for example as shown in FIG. 8A-FIG. 8E.

FIG. 7D also shows cross-sectional views of components of an example vehicle camera system 220. The components may include one or more cameras 208, a control system 704, and a vehicle environmental sensor 706 to detect an ambient weather condition or a position of an external light source 708 (such as the sun), for example.

The vehicle camera system 220 may also include a stepper motor 710 as part of an electromechanical system that allows the glare shield 202 to dynamically change its orientation in response to the position of the sun or other light sources. This system includes small actuators (not shown) that provide the glare shield 202 with the capability to tilt and maintain the optimal angle for light diffusion, ensuring consistent camera performance throughout varying lighting conditions.

In some examples, the electromechanical system is coupled to the control system 704 that receives input from the vehicle environmental sensor 706 to determine the position of the external light source 708. The electromechanical system is configured to move the glare shield 202 along or around one or more axes based on data received by the vehicle environmental sensor 706. The electromechanical system is further configured in some examples to store a plurality of predetermined glare shield orientations corresponding to a time of day or a position of the external light source 708. Referring again to FIG. 8A-FIG. 8E, it may be seen that in some examples, particularly for cone-shaped formations 602 having relatively high cone orientation angles, there is less capability or range for the vehicle camera system 220 (more specifically the electromechanical system) to orientate or adjust the glare shield 202 to tilt and maintain an optimal angle for light diffusion.

As mentioned above, the cone-shaped formations are designed in some examples with specific dimensions to optimize the Total Hemispherical Reflectance (THR) for the vehicle camera system. The base diameter of the cones ranges between 0.5 mm and 2 mm, while the height of the cones is optimized to be within a range that maximizes light diffusion without obstructing the camera's field of view.

Figure 9B:
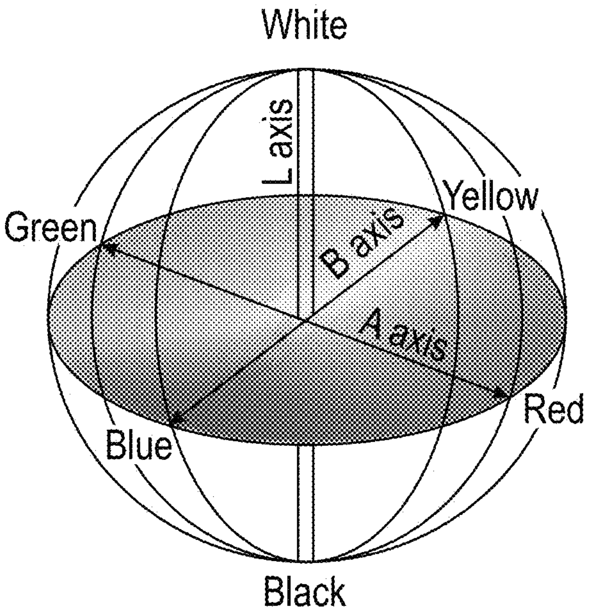
FIG. 9B is a color sphere used to ascertain the specifications listed in FIG. 9A, according to some examples.
Figure 9C:
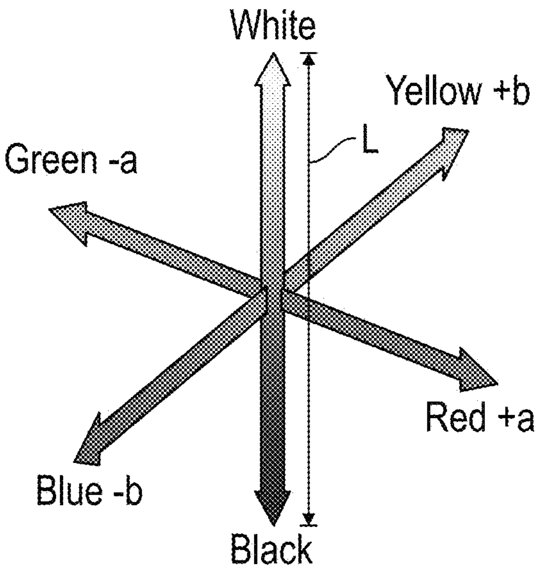
FIG. 9C is a color compass also used to ascertain the specifications listed in FIG. 9A, according to some examples.

FIG. 9A-FIG. 9C include a table 902 of example specifications for an example glare shield 202. The specifications in the column 904 may apply to a windscreen glare shield 202 of FIG. 1 for example, while the specifications of column 906 may apply to a B-pillar glare shield 202 of FIG. 3B, for example. The values of some of the table 902 specifications may be ascertained with reference to the color sphere of FIG. 9B and/or the color compass of FIG. 9C.

Figure 10:
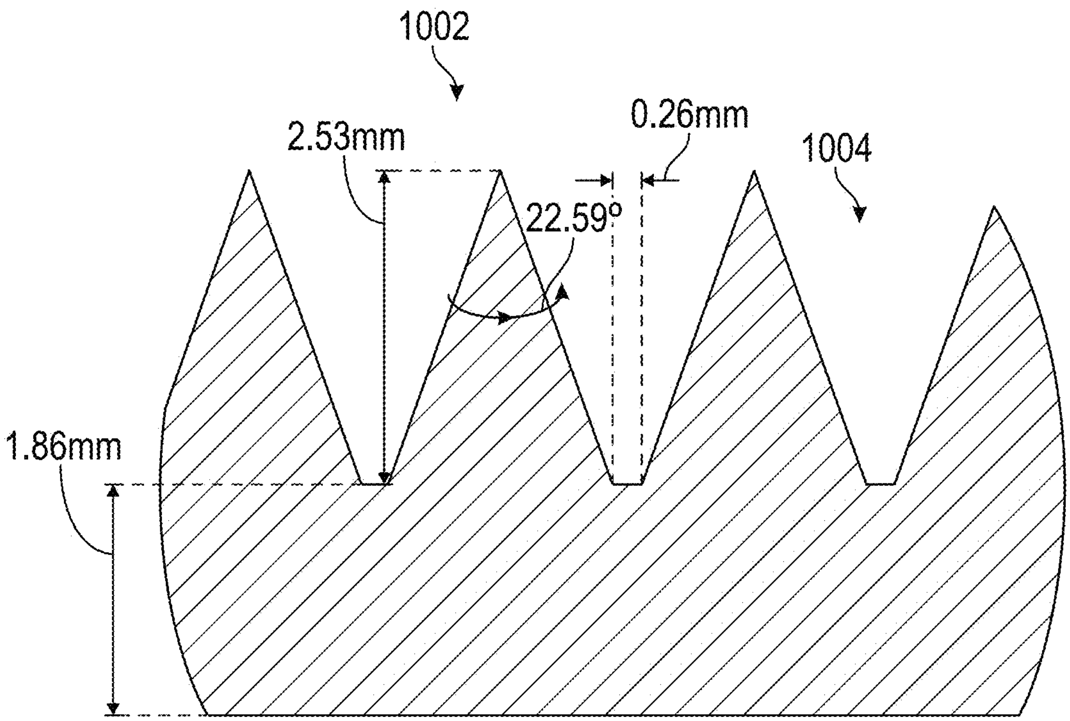
FIG. 10 is a perspective view of a sintered tool steel insert used in an example manufacturing process of a glare shield, showing an example venting pattern, according to some examples.

With reference to FIG. 10, in some examples, the glare shield 202 is manufactured using a sintered tool steel insert 1002 that allows for venting during the molding process. This may simplify the manufacturing process and ensures the precision and consistency of the cone-shaped texture. In some examples, a sintered steel mold including the sintered tool steel insert 1002 is employed. The sintered tool steel insert 1002 is created using a laser etching process to form a detailed venting pattern 1004. The venting pattern 1004 matches the arrangement 102 of the cone-shaped formations 602. The sintered nature of the steel allows for air to escape during the injection molding process, ensuring that the cones are formed without air traps and maintain their pointed shape. This pointed shape can be helpful for reducing the surface area available for light reflection, thereby enhancing the light-scattering effect.

In some examples, the manufacturing process of the glare shield utilizes a laser etching technique to create the detailed cone pattern in the sintered steel mold. This process allows for the creation of highly precise and intricate patterns that are difficult to achieve with traditional machining methods, resulting in a superior texture for light scattering.

Figure 11:
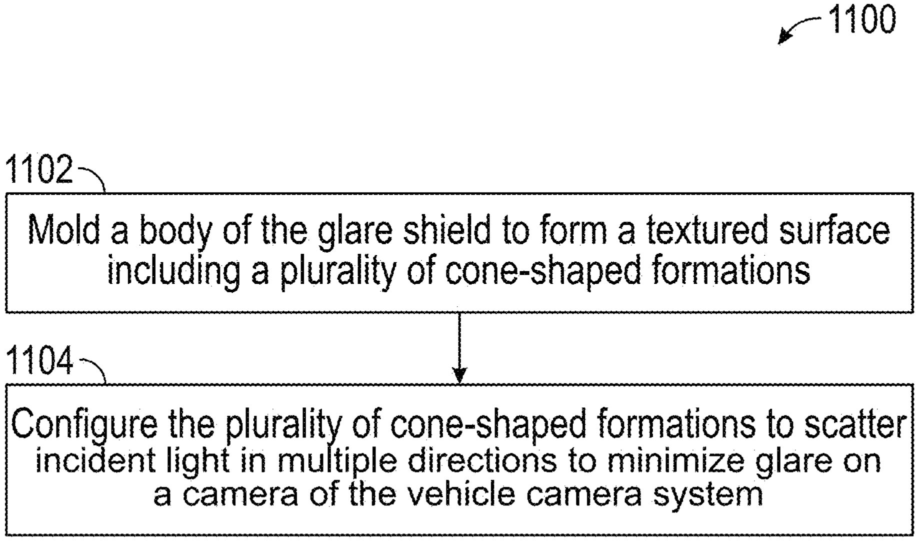
FIG. 11 is a flowchart illustrating operations in an example method of manufacturing the glare shield, according to some examples.

Some examples herein include methods. With reference to FIG. 11, operations in a method 1100 of manufacturing a glare shield for a vehicle camera system are now described. Although the described flow diagram below can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

In operation 1102, method 1100 molds a body of the glare shield to form a textured surface including a plurality of cone-shaped formations. In operation 1104, method 1100 configures the plurality of cone-shaped formations to scatter incident light in multiple directions to minimize glare on a camera of the vehicle camera system.

In some examples, the method 1100 further includes coating the textured surface with a low-reflectivity coating. In some examples, the method 1100 further includes selecting one or more dimensions for cone-shaped formations to optimize a Total Hemispherical Reflectance (THR) value for the vehicle camera system. In some examples, the one or more dimensions for cone-shaped formations are determined based on a simulation of light scattering and reflection patterns. In some examples, the method 1100 further includes integrating an electromechanical system with the glare shield to adjust an orientation of the glare shield in real time based on a position of an external light source. In some examples, integrating the electromechanical system includes programming the electromechanical system with a plurality of predetermined glare shield orientations. In some examples, the method 1100 further includes manufacturing the body using a sintered tool steel insert to facilitate venting during a molding process of the body. In some examples, the sintered tool steel insert includes a venting pattern that corresponds to an arrangement of cone-shaped formations.

The design of the glare shield is versatile and can be adapted for use in various locations on a vehicle, such as the windshield and the B-pillar, wherever cameras are installed. This adaptability allows the glare shield to be utilized to enhance the performance of autopilot systems by reducing glare in all camera-equipped areas of the vehicle.

EXAMPLES

Thus, some embodiments may include one or more of the following examples.

Example 1. A glare shield for a vehicle camera system, the glare shield comprising: a body having a textured surface, the textured surface including a plurality of cone-shaped formations, wherein cone-shaped formations are configured to scatter incident light in multiple directions to reduce glare on a camera of the vehicle camera system.

Example 2. The glare shield of example 1, wherein the cone-shaped formations are arranged in a uniform pattern across the textured surface.

Example 3. The glare shield of example 1 or 2, wherein the textured surface is coated with a low-reflectivity coating.

Example 4. The glare shield of any one of examples 1-3, wherein the body of the glare shield includes an elliptical or dished profile.

Example 5. The glare shield of any one of examples 1-4, wherein the cone-shaped formations are arranged in a uniform pattern in which base diameters of adjacent cones are contiguous.

Example 6. The glare shield of any one of examples 1-5, wherein the body of the glare shield includes a convergent tray structure mountable inside a windscreen or on a structure of a vehicle, wherein a direction of convergence of the convergent tray structure is directed towards the camera of the vehicle camera system.

Example 7. The glare shield of any one of examples 1-6, wherein the plurality of cone-shaped formations is provided on at least one interior surface of the convergent tray structure.

Example 8. The glare shield of any one of examples 1-6, wherein a rear wall of the convergent tray structure includes slots or openings to accommodate the camera of the vehicle camera system.

Example 9. The glare shield of any one of examples 1-6, wherein, relative to the camera, a distal region of the convergent tray structure is shallower than a proximal region of the convergent tray structure.

Example 10. The glare shield of any one of examples 1-6, wherein the convergent tray structure is manufactured using a sintered tool steel insert to facilitate venting during a molding process of the convergent tray structure.

Example 11. The glare shield of any one of examples 1-10, wherein the sintered tool steel insert comprises a venting pattern that corresponds to an arrangement of cone-shaped formations.

Example 12. The glare shield of any one of examples 1-11, wherein at least some of the cone-shaped formations are configured to reduce or optimize a Total Hemispherical Reflectance (THR) value for the vehicle camera system.

Example 13. The glare shield of any one of examples 1-12, wherein a base diameter of the cone-shaped formations is between 0.5 mm and 2 mm.

Example 14. The glare shield of any one of examples 1-13, wherein the cone-shaped formations have a cone half-axis angle in a range of 5-20 degrees.

Example 15. The glare shield of any one of examples 1-14, wherein the cone half-axis angle is in a range of 7-10 degrees.

Example 16. The glare shield of any one of examples 1-15, wherein a cone orientation angle of the cone-shaped formations in an installed glare shield relative to a horizontal plane is in a range of 55-105 degrees.

Example 17. The glare shield of any one of examples 1-16, further comprising an electromechanical system configured to adjust an orientation of the glare shield in real time based on a position of an external light source.

Example 18. The glare shield of any one of examples 1-17, wherein the electromechanical system is coupled to a control system that receives input from a vehicle environmental sensor to determine the position of the external light source.

Example 19. The glare shield of any one of examples 1-18, wherein the electromechanical system is configured to move the glare shield along or around one or more axes based on data received by the vehicle environmental sensor.

Example 20. The glare shield of any one of examples 1-19, wherein the electromechanical system is further configured to store a plurality of predetermined glare shield orientations corresponding to a time of day or the position of the external light source.

Example 21. A method of manufacturing a glare shield for a vehicle camera system, the method comprising: molding a body of the glare shield to form a textured surface including a plurality of cone-shaped formations; and configuring the plurality of cone-shaped formations to scatter incident light in multiple directions to minimize glare on a camera of the vehicle camera system.

Example 22. The method of example 21, further comprising coating the textured surface with a low-reflectivity coating.

Example 23. The method of example 21 or 22, further comprising selecting one or more dimensions for the plurality of cone-shaped formations to optimize a Total Hemispherical Reflectance (THR) value for the vehicle camera system.

Example 24. The method of any one of examples 21-23, wherein the one or more dimensions for the plurality of cone-shaped formations are determined based on a simulation of light scattering and reflection patterns.

Example 25. The method of any one of examples 21-24, further comprising integrating an electromechanical system with the glare shield to adjust an orientation of the glare shield in real time based on a position of an external light source.

Example 26. The method of any one of examples 21-25, wherein integrating the electromechanical system includes programming the electromechanical system with a plurality of predetermined glare shield orientations.

Example 27. The method of any one of examples 21-26, further comprising manufacturing the body using a sintered tool steel insert to facilitate venting during a molding process of the body.

Example 28. The method of any one of examples 21-27, wherein the sintered tool steel insert comprises a venting pattern that corresponds to an arrangement of the plurality of cone-shaped formations.

Other technical features may be readily apparent to one skilled in the art from the following figures, descriptions herein, and the following. While the above is a detailed description of some examples of the inventive subject matter, various alternatives, modifications, and equivalents may be used. Therefore, the above description should not be taken as limiting the scope of the inventive subject matter, which is defined by the appended claims.

It should be noted that the description and the figures above merely illustrate the principles of the present subject matter along with examples described herein and should not be construed as a limitation to the present subject matter. It is thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration.

Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few. The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Although the described flow diagrams herein can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A glare shield for a vehicle camera system, the glare shield comprising:

a body having a textured surface, the textured surface including a zone of inclined cone-shaped formations, wherein the inclined cone-shaped formations are configured to scatter incident light in multiple directions to reduce glare on a camera of the vehicle camera system, wherein a base diameter of each cone-shaped formation in the zone is between 0.5 mm and 2 mm, and wherein a longitudinal half axis of the inclined cone-shaped formations is non-perpendicular relative to a base plane of the textured surface, and wherein a cone orientation angle of the inclined cone-shaped formations in an installed glare shield relative to a horizontal plane is in a range of 55 to 105 degrees.

2. The glare shield of claim 1, wherein the cone-shaped formations are arranged in a uniform pattern across the textured surface.

3. The glare shield of claim 1, wherein the textured surface is coated with a low-reflectivity coating.

4. The glare shield of claim 1, wherein the body of the glare shield includes an elliptical or dished profile.

5. The glare shield of claim 1, wherein the cone-shaped formations are arranged in a uniform pattern in which base diameters of adjacent cones are contiguous.

6. The glare shield of claim 1, wherein the body of the glare shield includes a convergent tray structure mountable inside a windscreen or on a structure of a vehicle, wherein a direction of convergence of the convergent tray structure is directed towards the camera of the vehicle camera system.

7. The glare shield of claim 6, wherein the zone of cone-shaped formations is provided on at least one interior surface of the convergent tray structure.

8. The glare shield of claim 6, wherein a rear wall of the convergent tray structure includes slots or openings to accommodate the camera of the vehicle camera system.

9. The glare shield of claim 6, wherein, relative to the camera, a distal region of the convergent tray structure is shallower than a proximal region of the convergent tray structure.

10. The glare shield of claim 6, wherein the convergent tray structure is manufactured using a sintered tool steel insert to facilitate venting during a molding process of the convergent tray structure.

11. The glare shield of claim 10, wherein the sintered tool steel insert comprises a venting pattern that corresponds to an arrangement of cone-shaped formations.

12. The glare shield of claim 1, wherein at least some of the cone-shaped formations are configured to reduce or optimize a Total Hemispherical Reflectance (THR) value for the vehicle camera system.

13. The glare shield of claim 1, wherein the cone-shaped formations have a cone half-axis angle in a range of 5-20 degrees.

14. The glare shield of claim 13, wherein the cone half-axis angle is in a range of 7-10 degrees.

15. The glare shield of claim 1, further comprising an electromechanical system configured to adjust an orientation of the glare shield in real time based on a position of an external light source.

16. The glare shield of claim 15, wherein the electromechanical system is coupled to a control system that receives input from a vehicle environmental sensor to determine the position of the external light source.

17. The glare shield of claim 16, wherein the electromechanical system is configured to move the glare shield along or around one or more axes based on data received by the vehicle environmental sensor.

18. The glare shield of claim 15, wherein the electromechanical system is further configured to store a plurality of predetermined glare shield orientations corresponding to a time of day or the position of the external light source.

19. A method of manufacturing a glare shield for a vehicle camera system, the method comprising:

molding a body of the glare shield to form a textured surface including a zone of inclined cone-shaped formations, wherein a base diameter of each inclined cone-shaped formation is between 0.5 mm and 2 mm, and wherein a longitudinal half axis of the inclined cone-shaped formations is non-perpendicular relative to a base plane of the textured surface, and wherein a cone orientation angle of the inclined cone-shaped formations in an installed glare shield relative to a horizontal plane is in a range of 55 to 105 degrees; and configuring the cone-shaped formations to scatter incident light in multiple directions to minimize glare on a camera of the vehicle camera system.

20. The method of claim 19, further comprising coating the textured surface with a low-reflectivity coating.

21. The method of claim 19, further comprising selecting one or more dimensions for the cone-shaped formations to optimize a Total Hemispherical Reflectance (THR) value for the vehicle camera system.

22. The method of claim 21, wherein the one or more dimensions for the cone-shaped formations are determined based on a simulation of light scattering and reflection patterns.

23. The method of claim 19, further comprising integrating an electromechanical system with the glare shield to adjust an orientation of the glare shield in real time based on a position of an external light source.

24. The method of claim 23, wherein integrating the electromechanical system includes programming the electromechanical system with a plurality of predetermined glare shield orientations.

25. The method of claim 19, further comprising manufacturing the body using a sintered tool steel insert to facilitate venting during a molding process of the body.

26. The method of claim 25, wherein the sintered tool steel insert comprises a venting pattern that corresponds to an arrangement of the cone-shaped formations.

* * * * *